UNITED STATES PATENT OFFICE.

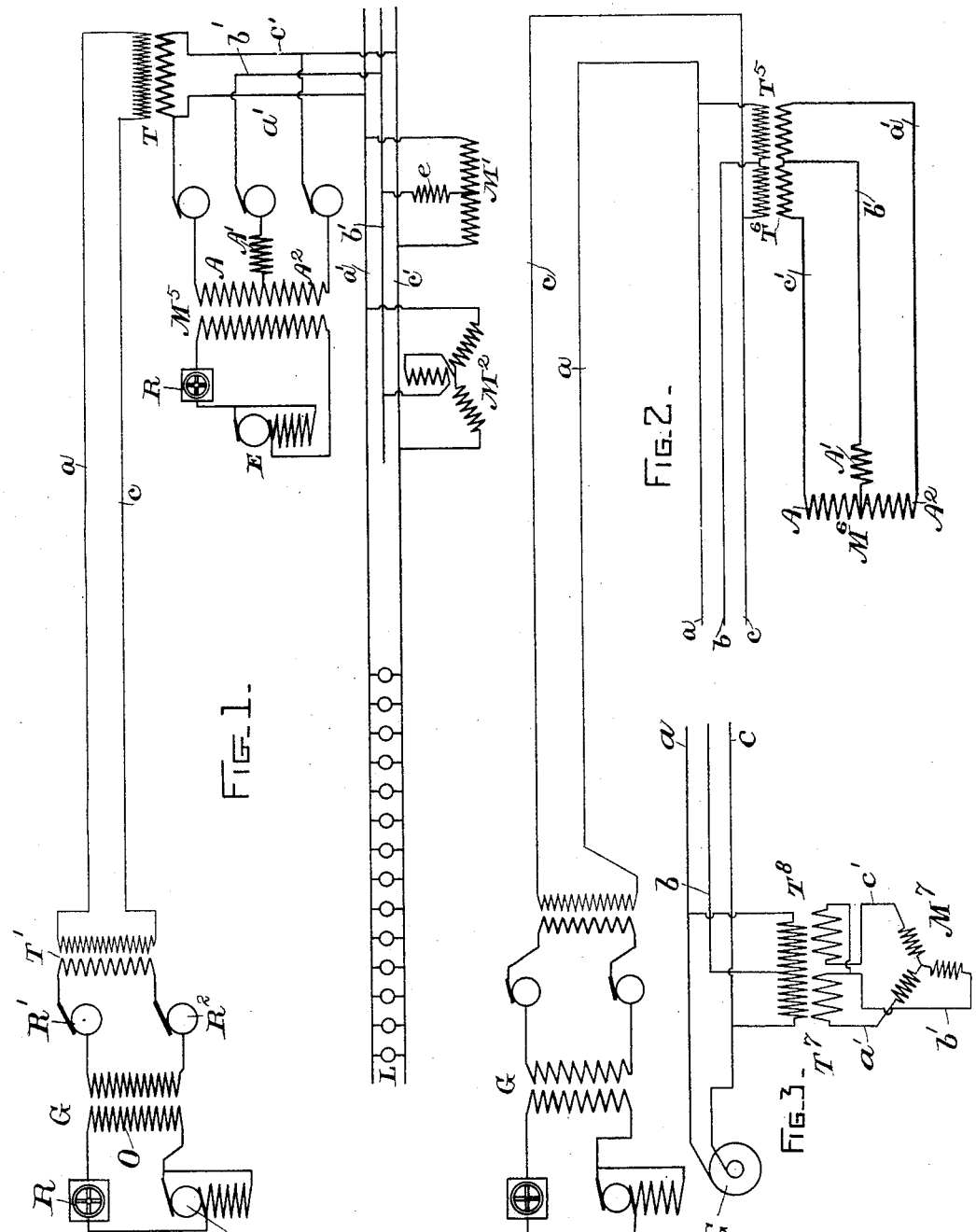

CHARLES P. STEINMETZ, OF SCHENECTADY, NEW YORK, ASSIGNOR TO THE GENERAL ELECTRIC COMPANY, OF NEW YORK.

SYSTEM OF ELECTRICAL DISTRIBUTION.

SPECIFICATION forming part of Letters Patent No. 533,378, dated January 29, 1895.

Application filed April 5, 1894. Serial No. 506,427. (No model.)

*To all whom it may concern:*

Be it known that I, CHARLES P. STEINMETZ, a subject of the Emperor of Germany, residing at Schenectady, county of Schenectady, State of New York, have invented certain new and useful Improvements in Systems of Electrical Distribution, of which the following is a specification.

The present invention relates to a system of electrical distribution for supplying electric lamps or other single phase translating devices, as well as poly-phase motors, with currents generated by a common source of power and distributed over an interconnected system of circuits, thereby saving expense as far as possible in the conductors, and in the generating plant.

In an another application, Serial No. 505,987, dated April 2, 1894, I have described a method of securing poly-phase currents from a generator of the single-phase type by maintaining upon an additional or middle main an electro-motive force of displaced phase such that polyphase currents may be derived from the different mains of the system. The present invention relates to a similar system.

It consists of a different method of attaining these ends from that specifically described in the application referred to, which will be found useful in many cases because it does not necessitate any change in the construction of the single-phase generators commonly installed, and saves in the wiring.

In the present invention single-phase currents are generated by any suitable form of generator, which may be transmitted over a single-phase circuit a greater or less distance to a district where poly-phase translating devices are installed. At such a point the out-of-phase electro-motive force is generated and maintained upon a separate main, which, with the mains of the single-phase circuit, constitute an interconnected poly-phase circuit from which poly-phase currents are derived. In this way, the additional main need not be run all the way to the main generating station but only over such parts of the system as demand poly-phase currents. The out-of-phase electromotive force may be derived at the desired point, from a machine resembling a synchronous or induction motor, having a main winding such as is ordinarily used in machines of this type, and a phase-modifying coil in which, when rotated in a magnetic field, the desired out-of-phase electromotive force is generated. These machines I term herein "phase converters." They may consist of machines specially installed for the purpose mentioned, or they may be motors driving a load and so performing mechanical work as well. Machines of other types may also be used; as for example, a generator designed to maintain the out-of-phase electromotive force, or a rotary transformer, or any other moving electro-magnetic machine.

In the accompanying drawings, Figure 1 illustrates in diagram a distribution system embodying one form of the invention. Fig. 2 similarly illustrates a somewhat modified form of the invention, and Fig. 3 shows a still further modification.

Referring to Fig. 1, G represents a single-phase alternator whose armature winding is connected through collector rings $R'$, $R^2$, and a step-up transformer $T'$, to the mains $a$ $c$, constituting a single-phase circuit. The field of the generator is excited by current flowing in a winding O, and supplied by a continuous current exciter E. The exciting current may be regulated by a resistance R so as to preserve the desired potential conditions in the main circuit. The primary coil of a step-down converter T is coupled across the mains $a$ $c$ and the secondary of this converter leads to a sub-circuit comprising single-phase mains $a'$ $c'$, across which are shown coupled incandescent lamps L. For the purpose of obtaining polyphase currents for operating polyphase motors installed on this sub-circuit, I provide a phase converter $M^5$ which has an armature winding A, $A^2$, whose terminals are connected to the mains $a'$ $c'$, and which therefore receives alternating single-phase currents from such mains. This machine is of the synchronous type, having its field supplied with continuous currents from an exciter E, and regulated by a resistance R in the exciting circuit. The main armature winding A $A^2$ is the same as that used in single phase alternating machines. A phase modifying coil $A'$, connected at one end to the central point of the main winding, leads through a collector ring to an additional or middle main $b'$, which with the single phase circuit mains $a'$ $c'$ constitutes for all practical purposes an interconnected poly-phase circuit. The coil $A'$ occupies a displaced position relatively to the main coil in the magnetic field. When so constructed the armature of the machine $M^5$ will rotate, as in the case of an ordinary synchronous motor, and, the modifying coil $A'$ gives rise to and maintains on the middle main $b'$, an out-of-phase electro-motive-force, such that poly-phase currents will be delivered to translating devices whose terminals are joined to the three mains. Such translating devices are shown at $M'$, $M^2$. $M'$ represents a motor constructed in a manner similar to machine $M^5$. It has a main winding connected across the mains $a'$ $c'$ and a supplementary winding $e$ coupled between the middle main $b'$, and the central point of the main winding. This last coil occupies a displaced position in the field of force, corresponding to the displacement of phase existing between the middle main and the outside mains. $M^2$ represents a three phase motor either of the synchronous or induction type, provided with a so-called "Y" winding and with its different coils connected to the mains $a'$ $b'$ $c'$. One of its coils, namely, that joined to main $b'$ is reversed, so that it may operate as a three phase motor with currents flowing in the coils one hundred and twenty degrees apart in phase, though in the diagram it is assumed that there is only sixty degrees difference of phase between the middle main $b'$ and the outside mains.

In Fig. 2 the arrangement of the generator G is the same as in Fig. 1, namely, a single phase generator with a separately excited field connected to the line inductively through a step-up transformer. $M^6$ represents a multiphase induction motor having a main winding A, $A^2$ connected inductively through the transformers $T^5$, $T^6$, and sub-mains $a'$ $c'$ with the single phase circuit $a$ $c$. A phase modifying coil $A'$ is connected to the middle point of the main winding and to an intermediate main $b'$. The arrangement of the main and modifying coils is the same as in the machine $M^5$, already described. The transformers $T^5$, $T^6$ have their primaries and secondaries connected in series across the mains $a$, $c$ and on the secondary side to the mains $a'$ $c'$. The main $b'$ is connected to the central point between the secondaries, and from a corresponding point on the primary side there runs mains $b$. With this arrangement the motor will receive alternating currents transformed to a comparatively low potential through the mains $a'$, $c'$, and, by the modifying action of the coil $A'$, an out-of-phase electro-motive-force on the middle main $b'$ is maintained, which is reflected back through the transformer system upon the middle main $b$ on the other or high potential side of the transformers. If the poly-phase currents are to be transmitted over considerable distances, this arrangement will save expense in the wiring, and before being delivered to poly-phase motors the currents may be again transformed down to a lower potential, if necessary.

In the arrangement shown in Fig. 1, the poly-phase currents are of comparatively low potential. Hence, this system is more suitable for distributing currents to motors located in a block or small area where the amount of copper needed for transmission is not a material factor.

In Fig. 3, a modified arrangement is shown for accomplishing the same purpose as the construction seen in Fig. 2, but requiring no change in the construction of machines now in common use. G represents as before a single phase generator whose terminals are connected to mains $a$, $c$. Two transformers $T^7$, $T^8$, have their primaries connected in series with the mains $a$, $c$, while from the central point between them is run a third main $b$. $M^7$ represents a three-phase motor having a Y winding. The terminals of two of the motor coils are connected by mains $a'$, $c'$, with the secondaries of the transformers, while the third coil is connected to main $b'$. The secondary of the transformer $T^8$ is reversed so as to alter the phase relation of the transformed current from sixty degrees on the primary side to one hundred and twenty degrees on the secondary side. With this arrangement, the machine $M^7$ will maintain an out-of-phase electro-motive force on the main $b'$ which is reflected back through the transformers in a manner similar to that described with reference to Fig. 2, except that the phase relation of the primary and secondary currents is altered in the transformers as well as the potential. In this way, it is possible to deal with currents at high voltage by a three phase machine wound as is customary for comparatively low potential.

What I claim as new, and desire to secure by Letters Patent of the United States, is—

1. The method of distribution which consists in generating single-phase currents in an electric circuit deriving therefrom an electromotive force of displaced phase, maintaining such electromotive force upon an additional main, and operating translating devices from such main and the mains of the single-phase circuit, as described.

2. The method of electrical distribution, which consists in generating single phase currents in an electric circuit, deriving therefrom an electro-motive-force of displaced phase, maintaining such electro-motive-force upon an additional main, and deriving poly-phase currents from such main and the mains of the single phase circuit, as described.

3. The method of distribution for single phase and poly-phase translating devices, which consists in generating single phase currents, distributing the same to lamps or other single phase translating devices by an electric circuit between the branches of which an alternating electro-motive-force is maintained, maintaining an electro-motive-force of displaced phase upon an additional main running through a district where poly-phase translating devices are installed, and deriving poly-phase currents from such main and the mains of the single phase circuit.

4. The method of electrical distribution, which consists in generating single phase currents, transforming such currents to a lower potential without altering their phasal relation, maintaining an electro-motive-force of displaced phase upon an additional main or mains, forming with the single phase mains a poly-phase circuit, and supplying poly-phase translating devices with currents from such mains.

5. The method herein described, which consists in passing alternating currents of single phase through a conductor movable in a magnetic field, generating by the motion thus produced an electro-motive-force of displaced phase in a second conductor occupying a displaced position in the magnetic field, and deriving poly-phase currents from such electro-motive-forces, as described.

6. The method herein described, which consists in generating single phase currents, leading the same through a transformer to a phase modifying electro-dynamic apparatus, generating therein an electro-motive-force of displaced phase, and reflecting back such electro-motive-force through the transformer system at a different potential to a main forming with the single phase mains a poly-phase circuit.

7. The method herein described which consists of generating and distributing by suitable mains single phase alternating currents of a given potential, transforming such currents to a lower potential, deriving therefrom an electro-motive-force upon a separate main, and reflecting back such electro-motive force through the transformer system to the higher potential existing on the primary side in a main forming with the single phase mains a polyphase circuit.

8. The combination of a source of current of the alternating single phase type connected to an electric circuit, with a phase converter having a rotating member connected to such circuit and to an additional main upon which it maintains an electro-motive-force of displaced phase, as set forth.

9. The combination of a source of single phase currents with a phase converter having mains for exciting its field with direct current, and provided with rotating coils A, $A^2$ and $A'$, interconnected as described, and having their free terminals connected respectively to the single phase circuit and to an additional main, forming therewith a polyphase circuit.

10. The combination with a source of single phase currents, of an electro-dynamic machine having a coil movable in a magnetic field which receives such currents and thereby produces rotation of a second coil having a displaced position in the magnetic field, in which is generated an electro-motive-force of displaced phase, and an additional main connected with the last named coil and forming with the mains of the single phase circuit a polyphase circuit, as described.

11. The combination in a distribution system, of a source of single phase currents, mains leading to a moving dynamic electro-magnetic apparatus, an additional main leading therefrom, and a modifying coil forming part of such apparatus delivering a current of displaced phase to such additional main.

12. The combination of a source of single phase currents, mains leading therefrom, transformers connected in series between such mains, an additional main leading from and connected between the transformers and forming with the single phase mains a polyphase circuit, and means adapted to reflect currents of displaced phase into the additional main, as described.

In witness whereof I have hereunto set my hand this 4th day of April, 1894.

CHARLES P. STEINMETZ.

Witnesses:
B. B. HULL,
C. L. HAYNES.